United States Patent
Kwon (10) Patent No.: US 10,353,425 B2
(45) Date of Patent: Jul. 16, 2019

(54) APPARATUS AND METHOD OF PROVIDING TIME INFORMATION

(71) Applicant: Hanwha Techwin Co., Ltd., Changwon-si (KR)

(72) Inventor: Bonghyen Kwon, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 129 days.

(21) Appl. No.: 15/170,286

(22) Filed: Jun. 1, 2016

(65) Prior Publication Data
US 2017/0060174 A1 Mar. 2, 2017

(30) Foreign Application Priority Data
Aug. 28, 2015 (KR) .................... 10-2015-0121831

(51) Int. Cl.
*G06F 1/14* (2006.01)

(52) U.S. Cl.
CPC ..................... *G06F 1/14* (2013.01)

(58) Field of Classification Search
CPC .......... G06F 1/14; G06F 1/266; G06F 9/4406; G06F 9/4401; G06F 9/44505; G06N 5/02
See application file for complete search history.

(56) References Cited

U.S. PATENT DOCUMENTS

2008/0318557 A1* 12/2008 Poulson ............... G04G 9/0076
455/414.1
2010/0318610 A1* 12/2010 Hisgen ................ G06F 11/0709
709/205

(Continued)

FOREIGN PATENT DOCUMENTS

CN 101431762 A 5/2009
JP 2013103402 A 5/2013

(Continued)

OTHER PUBLICATIONS

The First Chinese Office Action dated Dec. 29, 2018; Appln. No. 201610578856.6.

*Primary Examiner* — Austin Hicks
(74) *Attorney, Agent, or Firm* — Ladas & Parry LLP (57) ABSTRACT

A time information providing apparatus includes a power supply; a clock oscillator configured to generate a clock signal; a communicator configured to transmit a current-time information request to a content providing server or receive a current-time information response corresponding to the current-time information request from the content providing server via the network; a real-time clock (RTC) module configured to generate real-time information representing an actual time; and a controller configured to, in response to the power supply supplying power, control the clock oscillator to generate a clock signal, apply the clock signal to the RTC module, and control the communicator to transmit the current-time information request, and in response to the communicator receiving the current-time information response, control the RTC module to record current-time information based on the current-time information response, and control the RTC module to generate the real-time information by using the clock signal and the current-time information.

19 Claims, 5 Drawing Sheets

(56) References Cited

U.S. PATENT DOCUMENTS

| | | | | |
|---|---|---|---|---|
| 2013/0093468 A1* | 4/2013 | Rebel | ............... | H03K 23/66 |
| | | | | 327/105 |
| 2014/0020113 A1* | 1/2014 | Shah | ............... | G06F 21/60 |
| | | | | 726/27 |
| 2015/0121436 A1* | 4/2015 | Rango | ............... | G11B 27/10 |
| | | | | 725/88 |
| 2016/0378135 A1* | 12/2016 | Larson | ............... | G06F 1/14 |
| | | | | 713/2 |

FOREIGN PATENT DOCUMENTS

| | | |
|---|---|---|
| KR | 1020030062722 A | 7/2003 |
| KR | 1020080081213 A | 9/2008 |
| KR | 1020090068702 A | 6/2009 |

\* cited by examiner

APPARATUS AND METHOD OF PROVIDING TIME INFORMATION

CROSS-REFERENCE TO RELATED PATENT APPLICATION

This application claims priority from Korean Patent Application No. 10-2015-0121831, filed on Aug. 28, 2015, in the Korean Intellectual Property Office, the disclosure of which is incorporated herein by reference in its entirety.

BACKGROUND

1. Field

Apparatuses and methods consistent with exemplary embodiments relate to a time information providing apparatus and method of providing accurate time information.

2. Description of the Related Art

Electronic apparatuses, such as personal computers (PCs), servers, mobile terminals, and closed circuit TVs (CCTVs), may often need to check information about a current time in real-time in order to perform various tasks.

Real-time clock (RTC) apparatuses can provide accurate time information to the electronic apparatuses. In the related art, RTC apparatuses may be implemented separately from the electronic apparatuses, and may include a crystal oscillator which provides a clock signal and a special battery which supplies power thereto. Accordingly, electronic apparatuses of the related art can record time information in the RTC apparatuses and then acquire time information by accessing the RTC apparatuses as needed.

However, since these electronic apparatuses use a real-time clock (RTC) apparatus that requires a crystal oscillator and a battery separately, manufacturing costs may be increased.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a time information providing apparatus and method of providing accurate time information.

According to an aspect of an exemplary embodiment, there is provided a time information providing apparatus including: a power supply; a clock oscillator configured to generate a clock signal; a communicator configured to transmit a current-time information request to a content providing server via a network or receive a current-time information response corresponding to the current-time information request from the content providing server via the network; a real-time clock (RTC) module configured to generate real-time information representing an actual time; and a controller configured to, in response to the power supply supplying power, control the clock oscillator to generate a clock signal, apply the clock signal to the RTC module, and control the communicator to transmit the current-time information request, wherein the controller is further configured to, in response to the communicator receiving the current-time information response, control the RTC module to record current-time information based on the current-time information response, and control the RTC module to generate the real-time information by using the clock signal and the current-time information.

The clock oscillator may be further configured to generate a clock signal having a frequency of 32.768 kHz.

When the time information providing apparatus is connected to a first content providing server via the network, the controller may be further configured to control the communicator to transmit the current-time information request to the first content providing server, and, when the time information providing apparatus is not connected to the first content providing server via the network, the controller may be further configured to control the communicator to transmit the current-time information request to a second content providing server connected to the time information providing apparatus via the network.

In response to determining that the time information providing apparatus is not connected to at least one of the first content providing server and the second content providing server via the network, the controller may be further configured to again determine whether the time information providing apparatus is connected to the first content providing server via the network, after the lapse of a first predetermined time.

In response to a second predetermined time elapsing after the communicator receives the current-time information response, the controller may be further configured to control the communicator to transmit a new current-time information request to the content providing server, and, in response to the communicator receiving a new current-time information response corresponding to the new current-time information request from the content providing server, the controller may be further configured to control the RTC module to record new current-time information based on the new current-time information response and control the RTC module to update the real-time information by using the clock signal and the new current-time information.

When the time information providing apparatus is not connected to the content providing server via the network even when the second predetermined time has lapsed after the communicator receives the current-time information response, the controller may be further configured to provide the real-time information.

The clock oscillator may include: a phase lock loop (PLL) configured to generate a source clock signal; and a frequency divider configured to divide a frequency of the source clock signal to produce a frequency necessary for an operation of the RTC module.

The clock oscillator and the RTC module may receive power from the power supply.

According to an aspect of another exemplary embodiment, there is provided a method, performed by a terminal including a clock oscillator and a real-time clock (RTC) module, of providing real-time information, the method including: generating a clock signal and applying the clock signal to the RTC module in response to power being supplied to the terminal, wherein the generating and applying is performed by the clock oscillator; transmitting a current-time information request to a content providing server connected via a network; receiving a current-time information response corresponding to the current-time information request from the content providing server; recording current-time information in the RTC module, based on the current-time information response; and generating real-time information representing an actual time by using the clock signal and the current-time information, wherein the generating is performed by the RTC module.

The clock signal may have a frequency of 32.768 kHz.

The content providing server may be one of a first content providing server or a second content providing server, and the transmitting of the current-time information request to the content providing server may include: when the terminal is connected to the first content providing server via the network, transmitting the current-time information request to the first content providing server connected via the network; and when the terminal is not connected to the first content providing server via the network, transmitting the current-time information request to the second content providing server connected via the network.

The method may further include: in response to determining that the terminal is not connected to at least one of the first content providing server and the second content providing server via the network, again determining whether the terminal is connected to the first content providing server via the network, after the lapse of a first predetermined time.

The method may further include: in response to a second predetermined time elapsing after the receiving of the current-time information response, determining whether the terminal is connected to the content providing server via the network; when the terminal is connected to the content providing server via the network, transmitting a new current-time information request to the content providing server; receiving a new current-time information response corresponding to the new current-time information request from the content providing server; recording new current-time information in the RTC module, based on the new current-time information response; updating the real-time information by using the clock signal and the new current-time information, wherein the updating is performed by the RTC module; and providing updated real-time information.

The method may further include: when the terminal is not connected to the content providing server via the network, providing the generated real-time information.

The method may further include: acquiring image information via a camera included in the terminal; and providing the image information together with the real-time information.

According to an aspect of another exemplary embodiment, there is provided a network camera including a camera configured to acquire image information; a power supply configured to supply power to the network camera; a clock oscillator configured to generate a clock signal; a communicator configured to transmit a current-time information request to a content providing server via a network or receive a current-time information response corresponding to the current-time information request from the content providing server via the network; a real-time clock (RTC) module configured to generate real-time information representing an actual time; and a controller configured to, in response to the network camera being supplied with power, control the camera to acquire the image information, control the clock oscillator to generate the clock signal and apply the clock signal to the RTC module, and control the communicator to transmit the current-time information request, wherein the controller is further configured to, in response to receiving the current-time information response, control the RTC module to record current-time information based on the current-time information response, and control the RTC module to generate the real-time information by using the clock signal and the current-time information and provide the image information and the real-time information.

The clock oscillator may be further configured to generate a clock signal having a frequency of 32.768 kHz.

When the network camera is connected to a first content providing server via the network, the controller may be further configured to control the communicator to transmit the current-time information request to the first content providing server, and, when the network camera is not connected to the first content providing server via the network, the controller may be further configured to control the communicator to transmit the current-time information request to a second content providing server connected to the network camera via the network.

In response to determining that the network camera is not connected to at least one of the first content providing server and the second content providing server via the network, the controller may be further configured to again determine whether the network camera is connected to the first content providing server via the network, after the lapse of a first predetermined time.

In response to a second predetermined time elapsing after the communicator receives the current-time information response, the controller may be further configured to control the communicator to transmit a new current-time information request to the content providing server, and, in response to the communicator receiving a new current-time information response corresponding to the new current-time information request from the content providing server, the controller may be further configured to control the RTC module to record new current-time information based on the new current-time information response and control the RTC module to update the real-time information by using the clock signal and the new current-time information.

BRIEF DESCRIPTION OF THE DRAWINGS

The above and/or other aspects will be more apparent by describing exemplary embodiments with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

Figure 1:
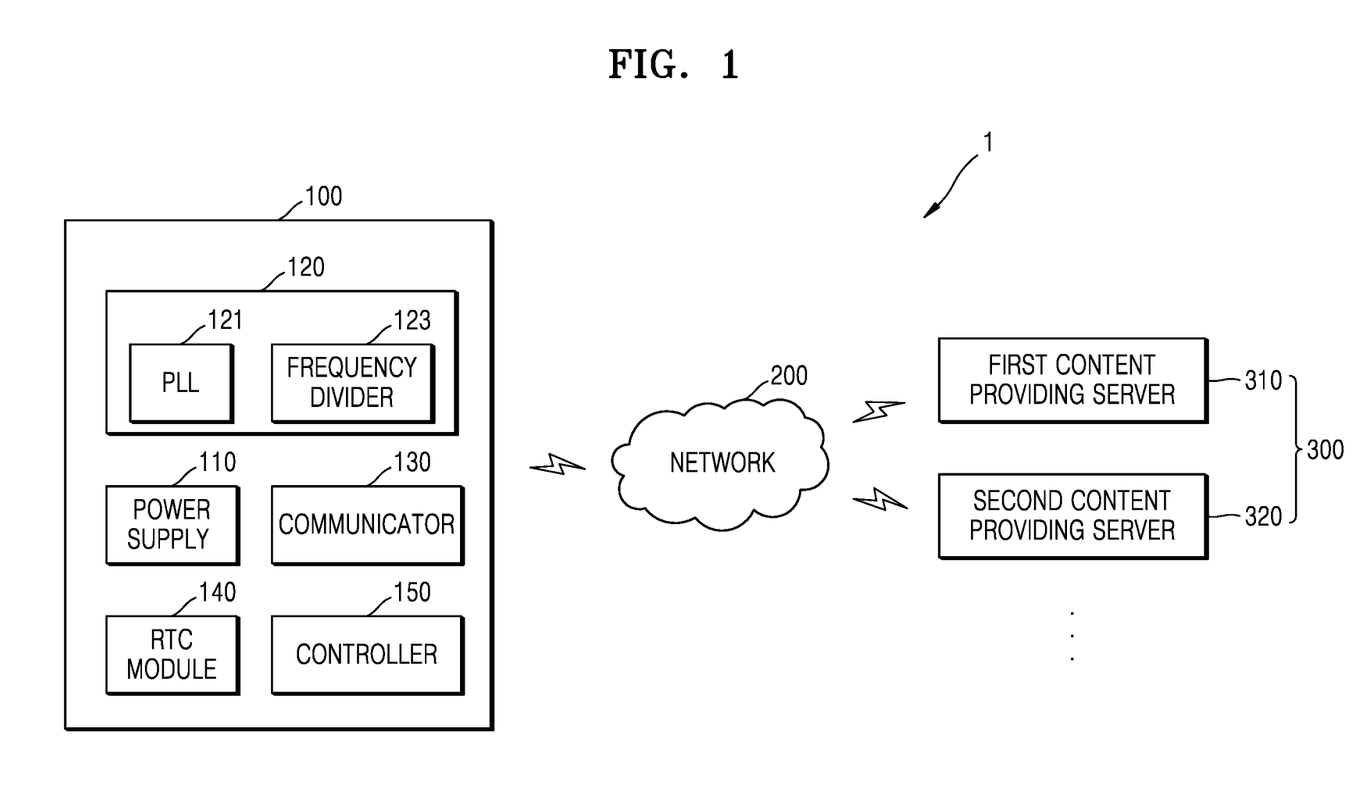
FIG. 1 is a block diagram of a time information providing system according to an exemplary embodiment.

FIG. 1 is a block diagram of a time information providing system 1 according to an exemplary embodiment.

Referring to FIG. 1, the time information providing system 1 includes a time information providing apparatus 100, a network 200, and at least one content providing server 300.

The time information providing apparatus 100 includes a power supply 110 supplying power to the time information providing apparatus 100, a clock oscillator 120 generating a clock signal, a communicator 130 transmitting a current-time information request to the at least one content providing server 300 via the network 200 or receiving a current-time information response corresponding to the current-time information request from the at least one content providing server 300 via the network 200, a real-time clock (RTC) module 140 generating real-time information representing an actual time, and a controller 150 controlling the clock oscillator 120 to generate the clock signal and apply the clock signal to the RTC module 140 and the communicator 130 to transmit the current-time information request to the at least one content providing server 300 when the time information providing apparatus 100 is supplied with the power of the power supply 110, controlling the RTC module 140 to record current-time information based on the current-time information response received via the communicator 130, and controlling the RTC module 140 to generate the real-time information by using the clock signal and the current-time information.

The power supply 110 supplies power to the time information providing apparatus 100. According to an exemplary embodiment, the clock oscillator 120 and the RTC module 140 may receive power from the power supply 110.

The clock oscillator 120 may receive power from the power supply 110 and generate a clock signal having a predetermined frequency. According to an exemplary embodiment, the clock oscillator 120 may include a phase lock loop (PLL) 121 and a frequency divider 123.

The PLL 121 may generate a source clock signal. According to an exemplary embodiment, the PLL 121 may generate a source clock signal having a frequency corresponding to n times of 32.768 kHz, but exemplary embodiments are not limited thereto.

The frequency divider 123 may divide a frequency of the source clock signal generated by the PLL 121 into a frequency necessary for an operation of the RTC module 140. According to an exemplary embodiment, the frequency divider 123 may output a clock signal having a frequency of 32.768 kHz, but exemplary embodiments are not limited thereto.

The communicator 130 may communicate with the at least one content providing server 300 connected to the time information providing apparatus 100 via the network 200. For example, the communicator 130 may transmit the current-time information request to the at least one content providing server 300 or receive the current-time information response from the at least one content providing server 300.

The RTC module 140 may receive power from the power supply 110 and generate the real-time information representing the actual time by using the clock signal and the current-time information. The current-time information may represent a standard-time.

According to an exemplary embodiment, the RTC module 140 may be a semiconductor device including a counter register. The RTC module 140 may record the current-time information in the counter register and change the current-time information recorded in the counter register according to time by using the clock signal, thereby generating the real-time information.

The controller 150 controls an operation of the time information providing apparatus 100.

When the time information providing apparatus 100 is powered on by the power supply 110, the controller 150 initializes the time information providing apparatus 100. To initialize the time information providing apparatus 100, the controller 150 may control the clock oscillator 120 to generate a clock signal having a frequency of, for example, 32.768 kHz, and apply the clock signal to the RTC module 140.

When the time information providing apparatus 100 is powered on by the power supply 110 and is initialized, the controller 150 may control the communicator 130 to transmit the current-time information request to the at least one content providing server 300. The at least one content providing server 300 may include, for example, a first content providing server 310 and a second content providing server 320. Priorities among the at least one content providing server 300 may be previously or arbitrarily determined, and may be changed according to a user input.

According to an exemplary embodiment, when the time information providing apparatus 100 is connected to the first content providing server 310 via the network 200, the controller 150 may control the communicator 130 to transmit a current-time information request to the first content providing server 310. On the other hand, when the time information providing apparatus 100 is not connected to the first content providing server 310 via the network 200, the controller 150 may control the communicator 130 to transmit the current-time information request to the second content providing server 320 connected to the controller 150 via the network 200. The case where the time information providing apparatus 100 is not connected to the first content providing server 310 via the network 200 may denote a case where the communicator 130 is unable to transmit the current-time information request to the first content providing server 310 or a case where the communicator 130 is unable to receive a current-time information response from the first content providing server 310, but exemplary embodiments are not limited thereto.

According to another exemplary embodiment, the controller 150 may control the communicator 130 to transmit the current-time information request to both the first content providing server 310 and the second content providing server 320 via the network 200. When the controller 150 receives respective current-time information responses from the first content providing server 310 and the second content providing server 320, the controller 150 may record current-time information in the RTC module 140 based on the earlier received one of the current-time information responses or the current-time information response received from the first content providing server 310, which has a higher priority than the second content providing server 320.

When the time information providing apparatus 100 is not connected to the at least one content providing server 300 via the network 200, the controller 150 may again determine whether the time information providing apparatus 100 has been connected to the at least one content providing server 300 via the network 200, after the lapse of a first predetermined time.

According to an exemplary embodiment, when the time information providing apparatus 100 is not connected to the first content providing server 310 and the second content providing server 320, the controller 150 may again determine whether the time information providing apparatus 100 is connected to the first content providing server 310 having a higher priority than the second content providing server 320, after the lapse of the first predetermined time.

According to another exemplary embodiment, when the time information providing apparatus 100 is not connected to the first content providing server 310 and the second content providing server 320, the controller 150 may again determine whether the time information providing apparatus 100 is connected to the first content providing server 310 and the second content providing server 320, after the lapse of the first predetermined time.

The first predetermined time may be previously or arbitrarily determined, and may be changed according to a user input.

When a second predetermined time elapses after the communicator 130 receives the current-time information response, the controller 150 may control the communicator 130 to transmit a new current-time information request to the at least one content providing server 300. When the communicator 130 receives a new current-time information response corresponding to the new current-time information request, the controller 150 may control the RTC module 140 to record new current-time information based on the new current-time information response and the RTC module 140 to update the real-time information by using the clock signal and the new current-time information.

The second predetermined time may be previously or arbitrarily determined, and may be changed according to a user input.

The controller 150 may provide the real-time information generated by the RTC module 140 based on a time point when real-time information is necessary. For example, the controller 150 may provide the real-time information generated by the RTC module 140 after the time information providing apparatus 100 is powered on by the power supply 110, or the real-time information updated by the RTC module 140 after the lapse of the second predetermined time.

According one or more exemplary embodiments, the controller 150 may provide accurate time information by acquiring real-time information from the RTC module 140, and reduce manufacturing costs by driving the clock oscillator 120 and the RTC module 140 with power that drives the time information providing apparatus 100.

The at least one content providing server 300 communicates with the time information providing apparatus 100 via the network 200. According to an exemplary embodiment, the at least one content providing server 300 may receive a current-time information request from the time information providing apparatus 100, generate current-time information such as standard-time information, and transmit a current-time information response to the time information providing apparatus 100.

For clarity, repeated descriptions are hereafter omitted or only briefly provided.

Figure 2:
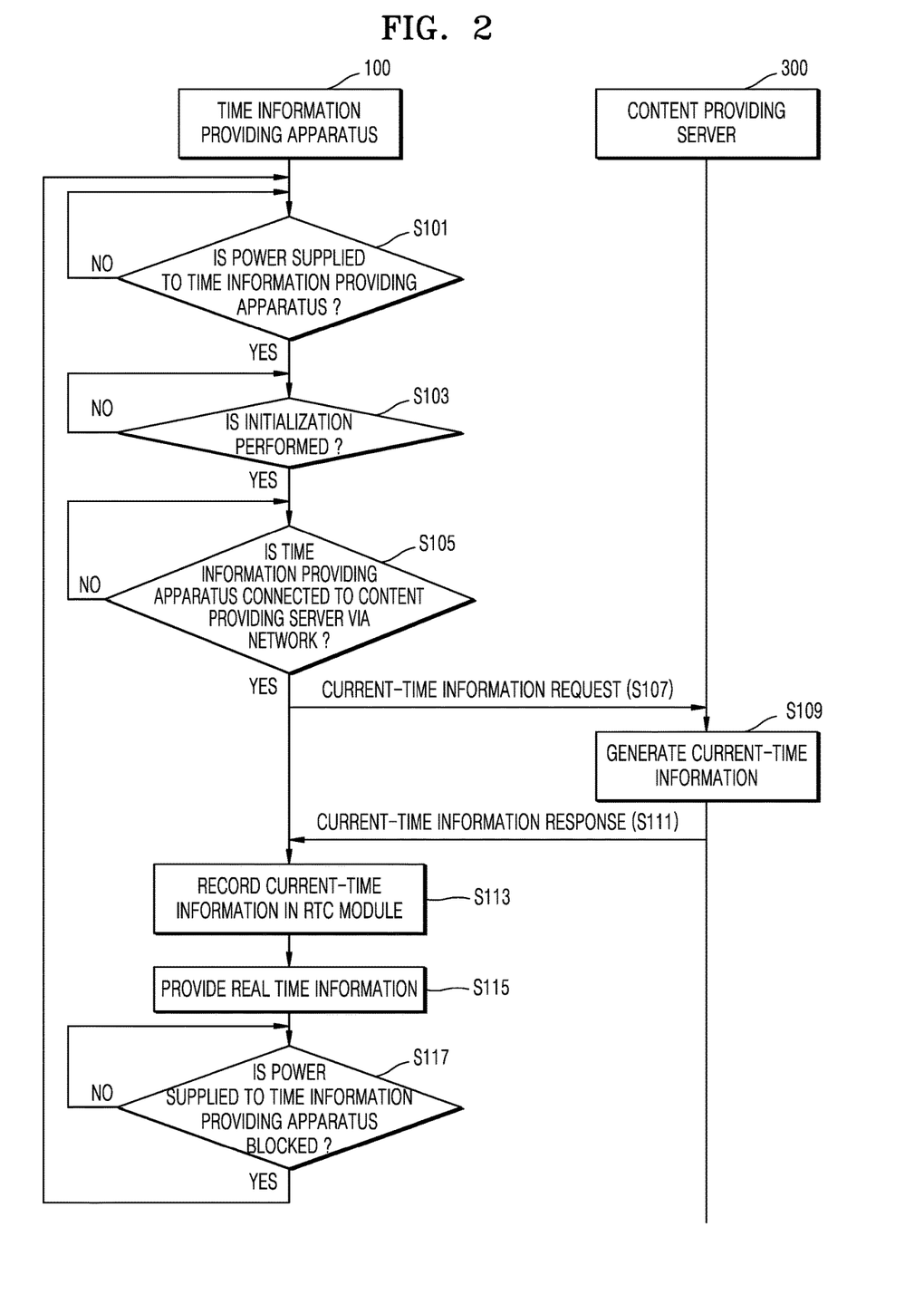
FIG. 2 is a flowchart of a time information providing method according to an exemplary embodiment.

FIG. 2 is a flowchart of a time information providing method according to an exemplary embodiment.

Referring to FIG. 2, the time information providing apparatus 100 determines whether power is supplied to the time information providing apparatus 100, in operation S101. The time information providing apparatus 100 may be a part of a terminal. The time information providing apparatus 100 may perform operations such as initialization, recording of current-time information, and provision of real-time information, only when a system that drives the time information providing apparatus 100 is turned on, thereby reducing manufacturing costs while providing accurate time information.

When the time information providing apparatus 100 is powered on, the time information providing apparatus 100 determines whether initialization is performed, in operation S103. According to an exemplary embodiment, the initialization may be performed by applying a clock signal having a frequency of 32.768 kHz generated by the clock oscillator 120 to the RTC module 140.

When the time information providing apparatus 100 is supplied with power and performs initialization, the time information providing apparatus 100 determines whether the time information providing apparatus 100 is connected to the at least one content providing server 300 via the network 200, in operation S105. The network connection of the time information providing apparatus 100 will now be described with reference to FIG. 3.

Figure 3:
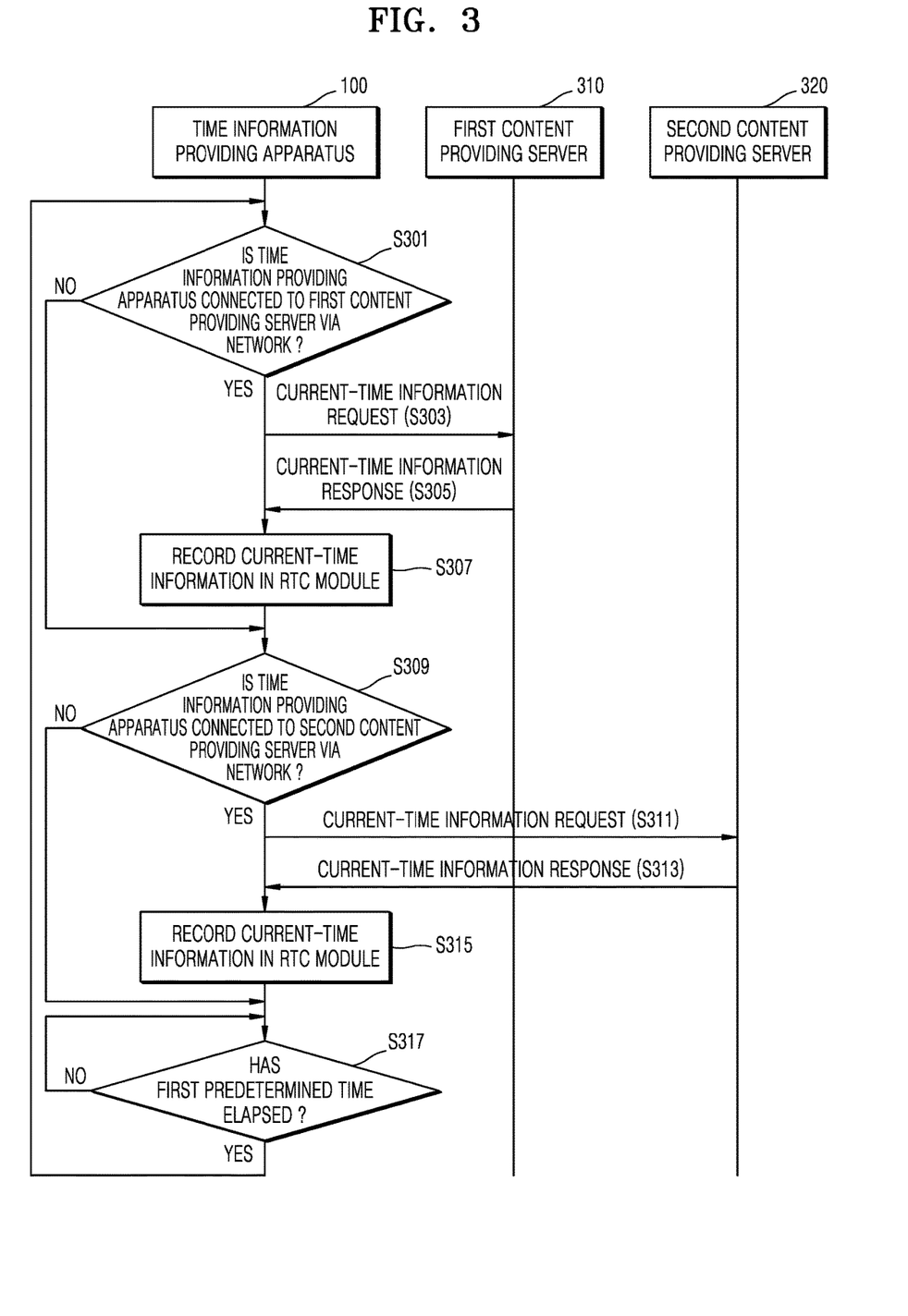
FIG. 3 is a flowchart of a network connecting method according to an exemplary embodiment.

FIG. 3 is a flowchart of a network connecting method according to an exemplary embodiment.

Referring to FIG. 3, when the time information providing apparatus 100 determines in operation S301 that the time information providing apparatus 100 is connected to the first content providing server 310 via the network 200, the time information providing apparatus 100 may transmit a current-time information request to the first content providing server 310, in operation S303, and may receive a current-time information response corresponding to the current-time information request from the first content providing server 310, in operation S305.

Then, in operation S307, the time information providing apparatus 100 may record current-time information in the RTC module 140, based on the current-time information response received from the first content providing server 310.

On the other hand, when the time information providing apparatus 100 determines in operation S301 that the time information providing apparatus 100 is not connected to the first content providing server 310 via the network 200, the time information providing apparatus 100 may determine whether the time information providing apparatus 100 is connected to the second content providing server 320 having lower priority than the first content providing server 310. For example, when the time information providing apparatus 100 fails to receive the current-time information response corresponding to the current-time information request from the first content providing server 310, the time information providing apparatus 100 may determine that the time information providing apparatus 100 has not been connected to the first content providing server 310. However, exemplary embodiments are not limited thereto.

When the time information providing apparatus 100 determines in operation S309 that the time information providing apparatus 100 is connected to the second content providing server 320 via the network 200, the time information providing apparatus 100 may transmit a current-time information request to the second content providing server 320, in operation S311, and may receive a current-time information response corresponding to the current-time information request from the second content providing server 320, in operation S313.

Then, in operation S315, the time information providing apparatus 100 may record current-time information in the RTC module 140, based on the current-time information response received from the second content providing server 320.

When the time information providing apparatus 100 determines that the time information providing apparatus 100 is not connected to both the first content providing server 310 and the second content providing server 320 via the network 200, the time information providing apparatus 100 may again determine whether the time information providing apparatus 100 is connected to the first content providing server 310 in operation S301, after the first predetermined time elapses in operation S317.

When the time information providing apparatus 100 according to such exemplary embodiments is supplied with power, the time information providing apparatus 100 may receive current-time information via the network 200 and thus provide accurate time information.

Referring back to FIG. 2, the time information providing apparatus 100 transmits a current-time information request to the at least one content providing server 300 connected thereto via the network 200, in operation S107.

The at least one content providing server 300 may generate current-time information according to the current-time information request, in operation S109. According to an exemplary embodiment, the at least one content providing server 300 may generate current-time information representing a standard-time.

Then, the time information providing apparatus 100 may receive a current-time information response corresponding to the current-time information request from the at least one content providing server 300, in operation S111.

In operation S113, the time information providing apparatus 100 may record the current-time information in the RTC module 140, based on the current-time information response. According to an exemplary embodiment, the time information providing apparatus 100 may record a standard-time in a counter register included in the RTC module 140.

In operation S115, the time information providing apparatus 100 may provide real-time information generated using the clock signal generated in operation S103 and the current-time information recorded in operation S113.

According to an exemplary embodiment, when the current-time information is recorded in the RTC module 140 in operation S113, the RTC module 140 may generate the real-time information representing an actual time by counting the current-time information by using the clock signal generated in operation S103. For example, the RTC module 140 may perform counting every second, starting from a time point when the current-time information has been recorded.

The time information providing apparatus 100 may provide information that requires accurate time information, together with the real-time information. For example, the time information providing apparatus 100 may provide image information acquired via a camera, together with the real-time information.

The time information providing apparatus 100 may periodically or arbitrarily provide the real-time information generated by the RTC module 140.

A real-time information update in which the above-described operations S107-S113 of the time information providing apparatus 100 are repeated will now be described with reference to FIG. 4.

Figure 4:
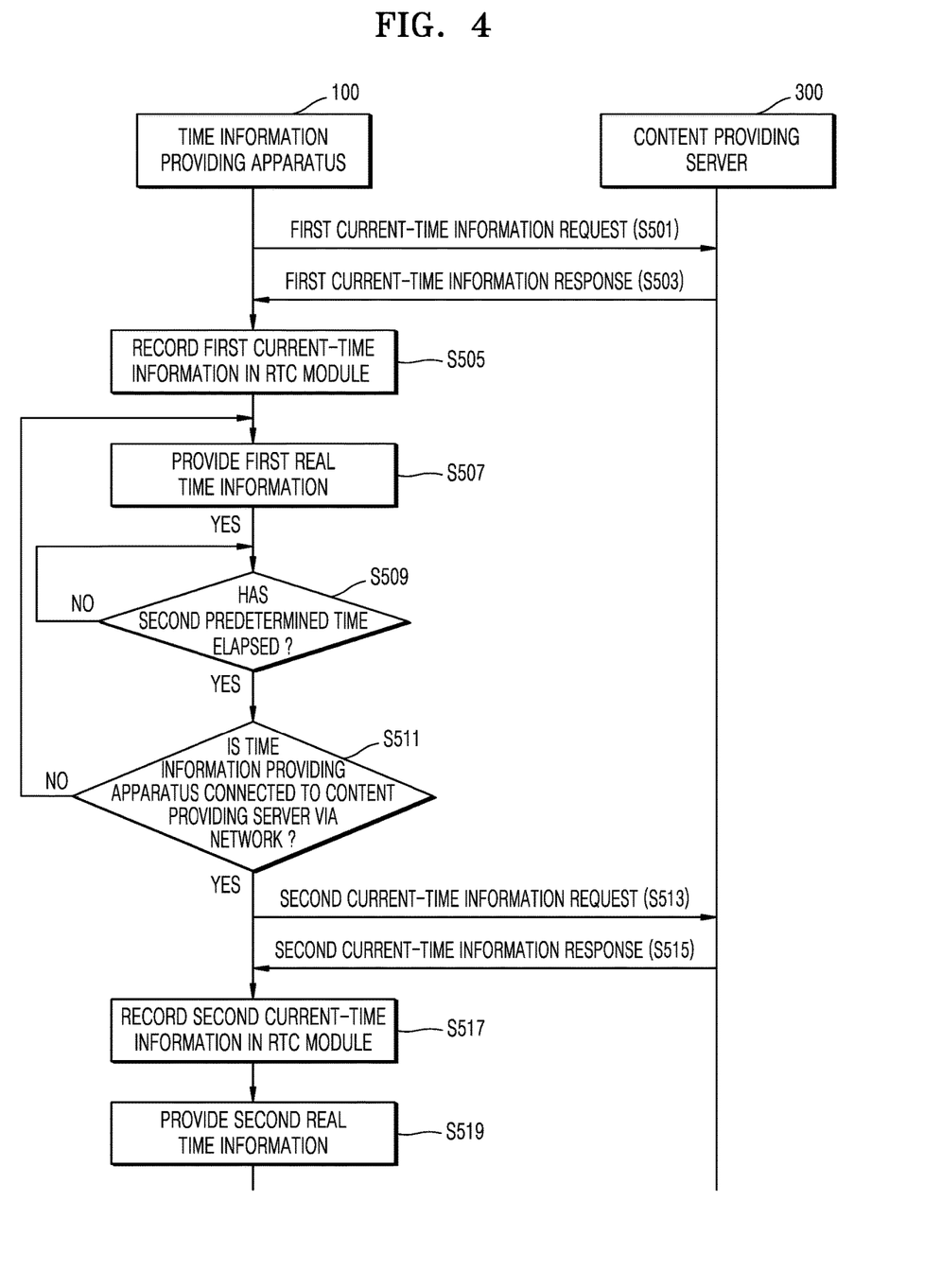
FIG. 4 is a flowchart of a time information updating method according to an exemplary embodiment.

FIG. 4 is a flowchart of a time information updating method according to an exemplary embodiment.

Referring to FIG. 4, the time information providing apparatus 100 may transmit a first current-time information request to the at least one content providing server 300, in operation S501, and may receive a first current-time information response corresponding to the first current-time information request from the at least one content providing server 300, in operation S503.

In operation S505, the time information providing apparatus 100 may record first current-time information in the RTC module 140, based on the first current-time information response. In operation S507, the time information providing apparatus 100 may provide first real-time information generated using the clock signal generated in operation S103 and the first current-time information recorded in operation S505.

When the second predetermined time has elapsed after the time information providing apparatus 100 receives the first current-time information response, in operation S509, the time information providing apparatus 100 determines whether the time information providing apparatus 100 is connected to the at least one content providing server 300 via the network 200, in operation S511.

When the time information providing apparatus 100 is connected to the at least one content providing server 300 via the network 200, the time information providing apparatus 100 may transmit a second current-time information request to the at least one content providing server 300, in operation S513, and may receive a second current-time information response corresponding to the second current-time information request from the at least one content providing server 300, in operation S515.

In operation S517, the time information providing apparatus 100 may record second current-time information in the RTC module 140, based on the second current-time information response. In operation S519, the time information providing apparatus 100 may provide second real-time information generated using the clock signal generated in operation S103 and the second current-time information recorded in operation S517.

On the other hand, when the time information providing apparatus 100 is not connected to the at least one content providing server 300 via the network 200, the RTC module 140 may provide the first real-time information, in operation S507.

According to the above-described exemplary embodiment, by periodically updating the current-time information recorded in the RTC module 140, the time information providing apparatus 100 may overcome limitations of the RTC module 140 consisting of a semiconductor device and generate more accurate real-time information.

Referring back to FIG. 2, the time information providing apparatus 100 determines whether power supplied to the time information providing apparatus 100 is blocked, in operation S117. When the system that drives the time information providing apparatus 100 is turned off, the time information providing apparatus 100 does not perform the above-described operations and thus reduces the cost for providing accurate time information.

Figure 5:
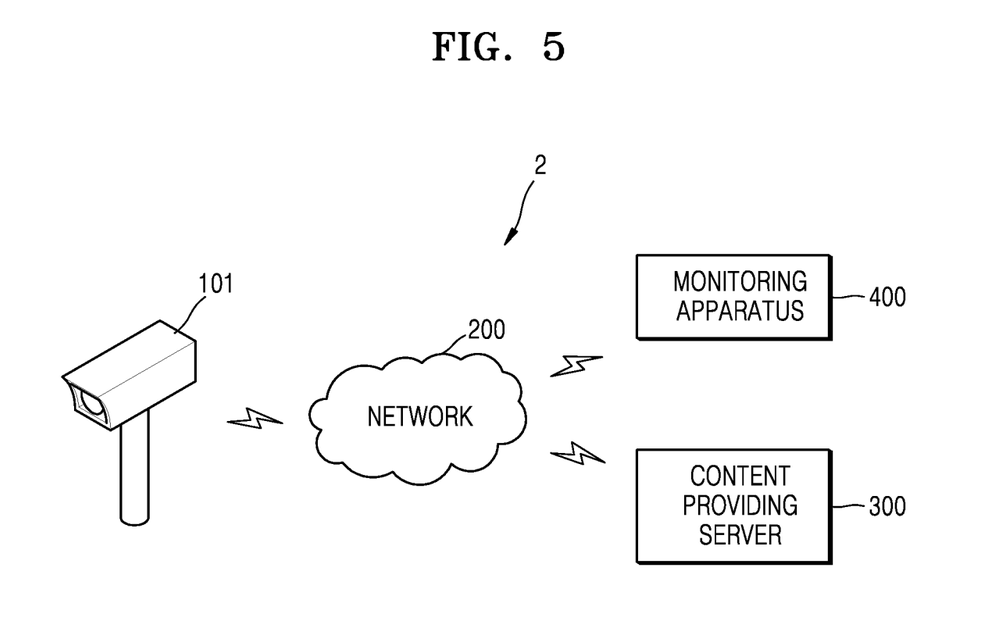
FIG. 5 is a block diagram of a network camera system according to an exemplary embodiment.

FIG. 5 is a block diagram of a time information providing system 2 according to another exemplary embodiment.

Referring to FIG. 5, the time information providing system 2 includes a network camera 101, the network 200, the at least one content providing server 300, and a monitoring apparatus 400.

The network camera 101 includes a camera and the time information providing apparatus 100 of FIG. 1. In other words, the network camera 101 includes a camera acquiring image information about a surveillance area, a power supply 110 supplying power to the network camera 101, a clock oscillator 120 generating a clock signal, a communicator 130 transmitting a current-time information request to the at least one content providing server 300 via the network 200 or receiving a current-time information response corresponding to the current-time information request from the at least one content providing server 300 via the network 200, an RTC module 140 generating real-time information representing an actual time, and a controller 150 controlling the camera to acquire the image information and the clock oscillator 120 to generate a clock signal and apply the clock signal to the RTC module 140 when the network camera 101 is powered on by the power supply 110, controlling the communicator 130 to transmit the current-time information request, controlling the RTC module 140 to record current-time information in response to the current-time information response received via the communicator 130, controlling the RTC module 140 to generate the real-time information by using the clock signal and the current-time information, and providing both the image information and the real-time information.

The camera may be a single fixed camera having a fixed photographing range or a Pan Tilt Zoom (PTZ) camera having a variable photographing range. The PTZ camera may easily change the surveillance area by using a single camera via a pan operation of rotating in a horizontal direction, a tilt operation of rotating in a vertical direction, and a zoom in/zoom out operation.

The network camera 101 may be connected to the monitoring apparatus 400 and the at least one content providing server 300 via the network 200. A surveillance function of the network camera 101 may be controlled by a command of the monitoring apparatus 400, and the network camera 101 may acquire current-time information from the at least one content providing server 300.

The monitoring apparatus 400 may display an image captured by the network camera 101 via the network 200.

According to the above-described exemplary embodiments, a time information providing apparatus and method provides accurate time information and reduces manufacturing costs.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code. T The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

At least one of the components, elements, modules or units represented by a block as illustrated in FIG. 1 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A time information providing apparatus comprising:
a power supply;
a clock oscillator configured to generate a clock signal;
a communicator configured to transmit a current-time information request to a content providing server via a network or receive a current-time information response corresponding to the current-time information request from the content providing server via the network;
a real-time clock (RTC) module configured to generate real-time information representing an actual time; and
a controller configured to, in response to the power supply supplying power, control the clock oscillator to generate a clock signal, apply the clock signal to the RTC module, and control the communicator to transmit the current-time information request,
wherein the controller is further configured to, in response to the communicator receiving the current-time information response, control the RTC module to record current-time information based on the current-time information response, and control the RTC module to generate the real-time information by using the clock signal and the current-time information,
wherein the controller is further configured to periodically transmit a new current-time information request to the content providing server via the network to update the real-time information,
wherein the power supply is configured to drive each of the clock oscillator, the RTC module, and the time information providing apparatus.

2. The time information providing apparatus of claim 1, wherein the clock oscillator is further configured to generate a clock signal having a frequency of 32.768 kHz.

3. The time information providing apparatus of claim 1, wherein, when the time information providing apparatus is connected to a first content providing server via the network, the controller is further configured to control the communicator to transmit the current-time information request to the first content providing server, and, when the time information providing apparatus is not connected to the first content providing server via the network, the controller is further configured to control the communicator to transmit the current-time information request to a second content providing server connected to the time information providing apparatus via the network.

4. The time information providing apparatus of claim 1, wherein, periodically transmitting a new current-time information request to the content providing server via the network to update the real-time information comprises:

in response to a second predetermined time elapsing after the communicator receives the current-time information response, the controller is further configured to control the communicator to transmit the new current-time information request to the content providing server, and, in response to the communicator receiving a new current-time information response corresponding to the new current-time information request from the content providing server, the controller is further configured to control the RTC module to record new current-time information based on the new current-time information response and control the RTC module to update the real-time information by using the clock signal and the new current-time information.

5. The time information providing apparatus of claim 4, wherein, when the time information providing apparatus is not connected to the content providing server via the network even when the second predetermined time has lapsed after the communicator receives the current-time information response, the controller is further configured to provide the real-time information.

6. The time information providing apparatus of claim 1, wherein the clock oscillator comprises:
a phase lock loop (PLL) configured to generate a source clock signal; and
a frequency divider configured to divide a frequency of the source clock signal to produce a frequency necessary for an operation of the RTC module.

7. The time information providing apparatus of claim 1, wherein the clock oscillator and the RTC module receive power from the power supply.

8. A time information providing apparatus comprising:
a power supply;
a clock oscillator configured to generate a clock signal;
a communicator configured to transmit a current-time information request to a content providing server via a network or receive a current-time information response corresponding to the current-time information request from the content providing server via the network;
a real-time clock (RTC) module configured to generate real-time information representing an actual time; and
a controller configured to, in response to the power supply supplying power, control the clock oscillator to generate a clock signal, apply the clock signal to the RTC module, and control the communicator to transmit the current-time information request,
wherein the controller is further configured to, in response to the communicator receiving the current-time information response, control the RTC module to record current-time information based on the current-time information response, and control the RTC module to generate the real-time information by using the clock signal and the current-time information,
wherein the power supply is configured to drive each of the clock oscillator, the RTC module, and the time information providing apparatus,
wherein, when the time information providing apparatus is connected to a first content providing server via the network, the controller is further configured to control the communicator to transmit the current-time information request to the first content providing server, and, when the time information providing apparatus is not connected to the first content providing server via the network, the controller is further configured to control the communicator to transmit the current-time information request to a second content providing server connected to the time information providing apparatus via the network,
wherein, in response to determining that the time information providing apparatus is not connected to at least one of the first content providing server and the second content providing server via the network, the controller is further configured to again determine whether the time information providing apparatus is connected to the first content providing server via the network, after the lapse of a first predetermined time.

9. A method, performed by a terminal including a clock oscillator and a real-time clock (RTC) module, of providing real-time information, the method comprising:
generating a clock signal and applying the clock signal to the RTC module in response to power being supplied to the terminal, wherein the generating and applying is performed by the clock oscillator;
transmitting a current-time information request to a content providing server connected via a network;
receiving a current-time information response corresponding to the current-time information request from the content providing server;
recording current-time information in the RTC module, based on the current-time information response;
generating real-time information representing an actual time by using the clock signal and the current-time information, wherein the generating is performed by the RTC module;
acquiring image information via a camera included in the terminal; and
providing the image information together with the real-time information,
wherein the current-time information is only recorded in the RTC module when the terminal is turned on,
wherein the controller is further configured to periodically transmit a new current-time information request to the content providing server via the network to update the real-time information.

10. The method of claim 9, wherein the clock signal has a frequency of 32.768 kHz.

11. The method of claim 9, wherein
the content providing server is one of a first content providing server or a second content providing server, and
the transmitting of the current-time information request to the content providing server comprises:
when the terminal is connected to the first content providing server via the network, transmitting the current-time information request to the first content providing server connected via the network; and
when the terminal is not connected to the first content providing server via the network, transmitting the current-time information request to the second content providing server connected via the network.

12. The method of claim 11, further comprising:
in response to determining that the terminal is not connected to at least one of the first content providing server and the second content providing server via the network, again determining whether the terminal is connected to the first content providing server via the network, after the lapse of a first predetermined time.

13. The method of claim 9, further comprising:
in response to a second predetermined time elapsing after the receiving of the current-time information response, determining whether the terminal is connected to the content providing server via the network;
when the terminal is connected to the content providing server via the network, transmitting a new current-time information request to the content providing server;
receiving a new current-time information response corresponding to the new current-time information request from the content providing server;
recording new current-time information in the RTC module, based on the new current-time information response;
updating the real-time information by using the clock signal and the new current-time information, wherein the updating is performed by the RTC module; and
providing updated real-time information.

14. The method of claim 13, further comprising:
when the terminal is not connected to the content providing server via the network, providing the generated real-time information.

15. A network camera comprising:
a camera configured to acquire image information;
a power supply configured to supply power to the network camera;
a clock oscillator configured to generate a clock signal;
a communicator configured to transmit a current-time information request to a content providing server via a network or receive a current-time information response corresponding to the current-time information request from the content providing server via the network;
a real-time clock (RTC) module configured to generate real-time information representing an actual time; and
a controller configured to, in response to the network camera being supplied with power, control the camera to acquire the image information, control the clock oscillator to generate the clock signal and apply the clock signal to the RTC module, and control the communicator to transmit the current-time information request from the content providing server via the network,
wherein, when it is determined that the network camera is connected the content providing server via the network, the controller is further configured to, in response to receiving the current-time information response, control the RTC module to record current-time information based on the current-time information response, and control the RTC module to generate the real-time information by using the clock signal and the current-time information and provide the image information and the real-time information,
wherein, when it is determined that the network camera is not connected to the content providing server via the network, the controller is further configured to again determine whether the network camera is connected to the content providing server via the network, after the lapse of a first predetermined time,
wherein the power supply is configured to drive each of the clock oscillator, the RTC module, and the network camera.

16. The network camera of claim 15, wherein the clock oscillator is further configured to generate a clock signal having a frequency of 32.768 kHz.

17. The network camera of claim 15, wherein, when the network camera is connected to a first content providing server via the network, the controller is further configured to control the communicator to transmit the current-time information request to the first content providing server, and, when the network camera is not connected to the first content providing server via the network, the controller is further configured to control the communicator to transmit the current-time information request to a second content providing server connected to the network camera via the network.

18. The network camera of claim 17, wherein, in response to determining that the network camera is not connected to at least one of the first content providing server and the second content providing server via the network, the controller is further configured to again determine whether the network camera is connected to the first content providing server via the network, after the lapse of the first predetermined time.

19. The network camera of claim 15, wherein, in response to a second predetermined time elapsing after the communicator receives the current-time information response, the controller is further configured to control the communicator to transmit a new current-time information request to the content providing server, and, in response to the communicator receiving a new current-time information response corresponding to the new current-time information request from the content providing server, the controller is further configured to control the RTC module to record new current-time information based on the new current-time information response and control the RTC module to update the real-time information by using the clock signal and the new current-time information.

* * * * *